June 23, 1959

H. ROBRA 2,891,299

METHOD AND DEVICE FOR FORGING MULTI-THROW CRANKSHAFTS

Filed Jan. 18, 1955

INVENTOR
H. Robra
ATTYS.

June 23, 1959  H. ROBRA  2,891,299
METHOD AND DEVICE FOR FORGING MULTI-THROW CRANKSHAFTS
Filed Jan. 18, 1955  7 Sheets-Sheet 2

INVENTOR
H. Robra
ATTYS.

INVENTOR
H. Robra
ATTYS.

June 23, 1959  H. ROBRA  2,891,299
METHOD AND DEVICE FOR FORGING MULTI-THROW CRANKSHAFTS
Filed Jan. 18, 1955  7 Sheets-Sheet 6

FIG.13

INVENTOR
H. Robra

June 23, 1959     H. ROBRA     2,891,299
METHOD AND DEVICE FOR FORGING MULTI-THROW CRANKSHAFTS
Filed Jan. 18, 1955     7 Sheets-Sheet 7

FIG. 14

INVENTOR
H. Robra
ATTYS.

United States Patent Office 2,891,299
Patented June 23, 1959

2,891,299

METHOD AND DEVICE FOR FORGING MULTI-THROW CRANKSHAFTS

Helmut Robra, Mulheim (Ruhr), Germany, assignor to Schloemann Aktiengesellschaft, Dusseldorf, Germany Application January 18, 1955, Serial No. 482,640

Claims priority, application Germany February 8, 1954

10 Claims. (Cl. 29—6)

The invention relates to a method and a device for the progressive forging of multi-throw crankshafts from a round shaft with pressed journals, where the cranks are finish-pressed at the required angular positions so that a subsequent angular displacement of the cranks is not necessary. The method and the device are particularly suitable for the forging of small quantities of crankshafts.

Methods for the production of crankshaft cranks without a subsequent angular displacement are already known. The required angle of displacement of, say, 90° is set by means of a template and then pressed in a closed die. The disadvantage of this method is that high pressures are required, which necessitate strong dies. The heat losses are considerable, owing to the large die surfaces, so that re-heating operations are necessary. Excess material cannot flow off freely, and fins are formed at the parting surfaces of the dies.

Overlapping and fibre distortion are possible. Also, for this method different dies are required for each type of crankshaft, so that small batches are comparatively expensive to make.

According to another method which has been proposed, the punch of the press presses the semi-finished material in a multiple die, which is open at the commencement of the work and is closed by this action of the punch, so that the surfaces of the shoulders at the sides of the punch retain towards the end of the press stroke the rising material and thus close the die.

The angles are set from crank to crank before the finish-pressing by means of a template. With this type of die crankshafts with forged-on balance weights can be produced. The disadvantage of this method is that the measurement of the angular displacement from crank to crank is inaccurate and that the setting of the cranks takes much time. Since the die closes at the end of the operation, this process shows approximately the same defects as the process employing a closed die.

According to this invention, these disadvantages in the production of multi-throw crankshafts from a round shaft with pressed journals are avoided by pressing the large portions between the journals by means of two opposing lateral dies, so as to deform the said portions of the shaft and from opposite guide surfaces, while they are given at the same time angles of displacement corresponding to those of the throws, that is to say, 90° or 120°, and a length corresponding to the crank pin which is to be made. Other dies prepare at the same time the crank webs, and subsequently the deformed portion is finish-pressed by means of punch acting in the direction along the guide surfaces of the deformed portion, while the other dies hold the prepared crank web in position.

It is convenient to carry out the initial deforming operation which forms the opposite guide surfaces on the intermediate parts of the large portions and the preparing of the crank web in a die which is open above and below. When subsequently the throws are finish-pressed, the crank webs are preferably situated in a die which is open at the top and at the bottom, so that the material rises during the finish-pressing operation in the part of the crankshaft comprising the crank webs, and form balance-weights if required.

It is also advantageous to employ the guide surfaces formed during the pressing-in of the sides as reference surfaces for the finish-pressing of the crank pins. This will avoid to a considerable extent inaccuracies in the angular displacement from crank to crank and loss of time during the forging process, so that it will in general not be necessary to reheat the workpiece during the formation of the throws. Since the material is pressed in an open die, any formation of fins and overlapping is excluded.

In order to carry out this process a forging device which can be built into a press can be employed, where the said forging device has the characteristic feature that it is provided with a hydraulically operated holding device of a known type, which clamps the crankshaft so as to prevent, for instance, any elongation during the forging process, and with another hydraulically operated pressure device for the formation of lateral side faces of the portion which is to be finish-pressed and for the formation of the crank webs, and also with a hydraulically operated press punch with prongs for the finish-pressing of the throws.

In order that the invention may be clearly understood and readily carried into effect, the same will now be described more fully with reference to the accompanying drawings, in which.

Figure 1:
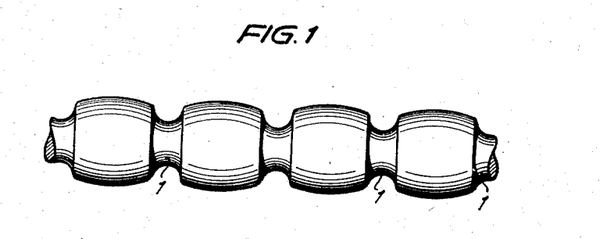
Figure 1 shows a round shaft with pressed journals.
Figures 2, 3, 4, 6:
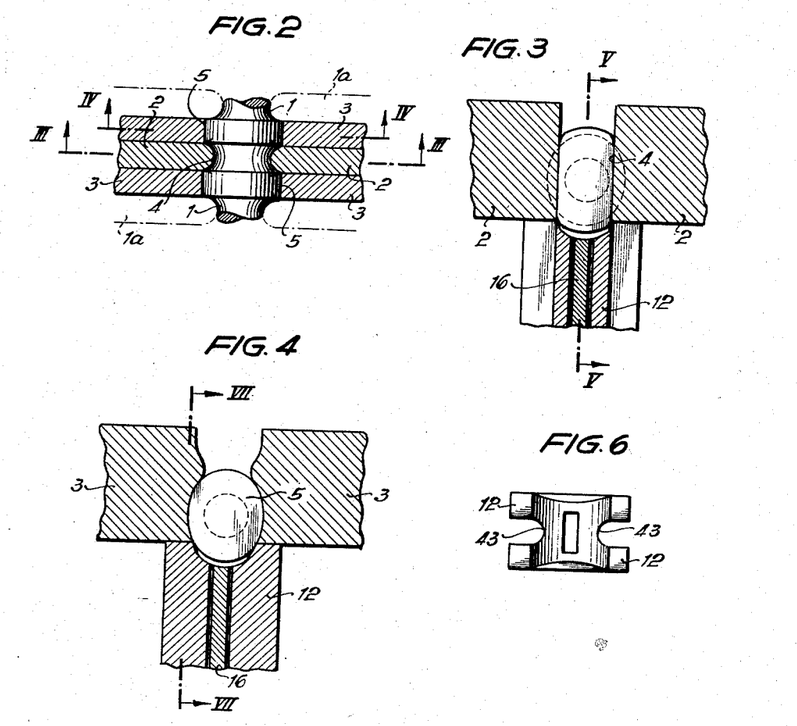
Figure 2 is the scheme of the operations during the preparing process.
Figure 3 is a section along the line III—III of Figure 2.
Figure 4 is a section along the line IV—IV of Figure 2.
Figure 6 is a plan view of the lower die.

Figure 1 shows a prepared shaft with the journals 1 pressed in. Enlarged portions are situated between the journals. Figure 2 shows the scheme of the first two press passes. In the first pass the bars 1a press progressively in three steps the journals 1 (Figure 1) on the rough shaft. In the second pass the bars 2 press between the two journals 1 against the enlarged portion. This will form opposite guide surface portions 4 having the width of 2 (Figure 2), which is given a shape seen in Figures 2, 3, 5 and 7. At the same time the dies 3 press against the workpiece and form two outer sections 5 between the two journals 1. The cross-section of the portion 5 is shown in Figure 4. During this pass excess material can escape upwards or downwards between the parts of the die.

Figure 5:
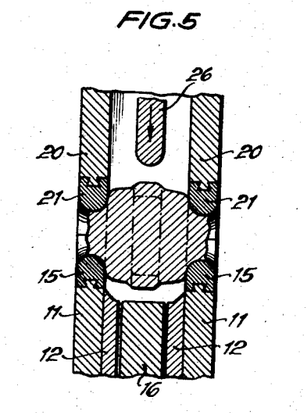
Figure 5 is a section along the line V—V of Figure 3, but during the next operation.
Figure 7:
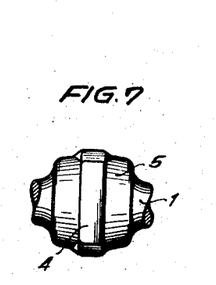
Figure 7 is a side view of the prepared enlarged portion.
Figure 8:
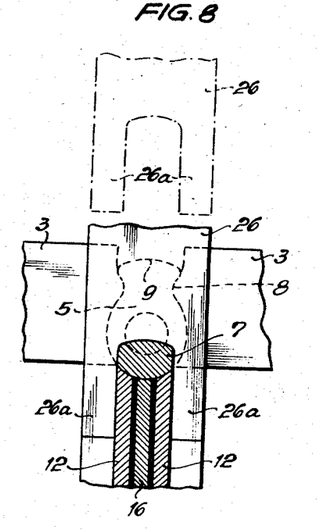
Figure 8 is a section through the throw during the last operation.
Figure 9:
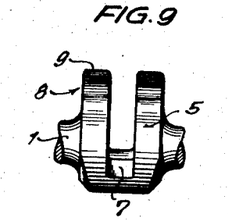
Figure 9 is a finished throw of the shaft.
Figure 10:
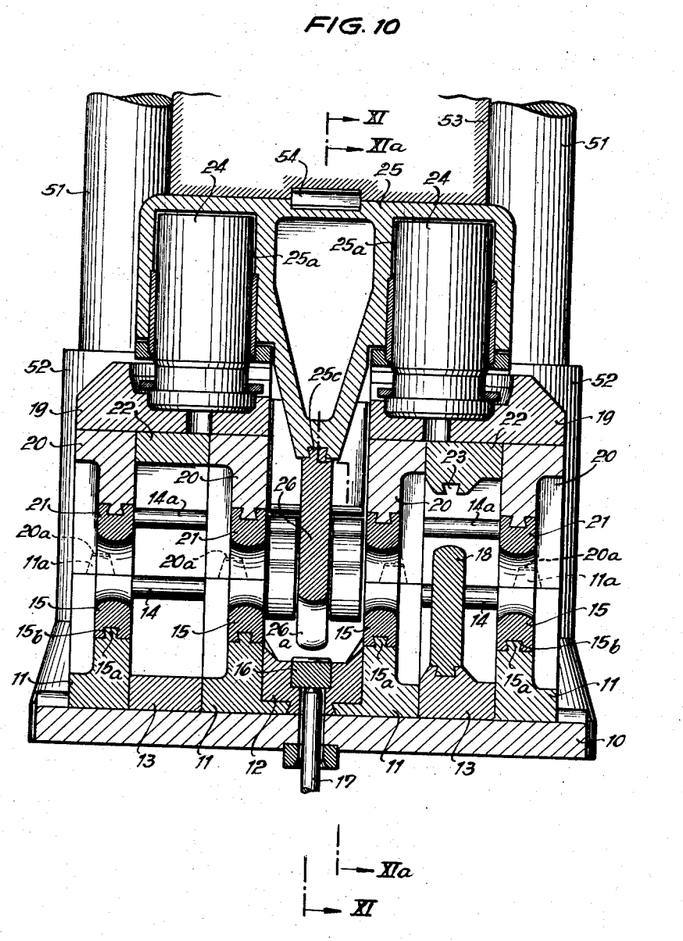
Figure 10 is a device for carrying out the process according to the present invention by means of a forging press, shown in section along the line X—X of Figure 11.

A longitudinal section and a side view in Figures 5 and 7 show the shape of the enlarged portion between the two journals 1 at this stage. Now a punch 26, Figures 5 and 8, whose prongs 26a grip round the guide surface portions 4, presses the said portion downward against the lower die 12 and gives the crank pin the shape shown at 7 (Figures 8, 9). The crank webs are formed by leaving those dies, which have the function of pressing the sides into straight guide surfaces and correspond to the shape at 8, in a given position. Owing to the open form of the dies 3 the material can rise and the fronts of the crank webs are formed as shown at 8, while their upper portions are formed as shown at 9, (Figure 8).

The apparatus employed for these operations is used in an existing forging press, of which the essential parts are shown in Figures 10 to 13. The forging press, whose main piston, cylinder and returning device are not shown, consists of the lower frame 50, four pull rods 51 with stroke limiting sleeves 52, the cross-head 53, which can be moved up and down, and the sliding bed 55. The cross-head carries out all forging operations according to this invention in vertical and horizontal directions. This enables the method to be carried out in the apparatus which will be described below.

Figure 11:
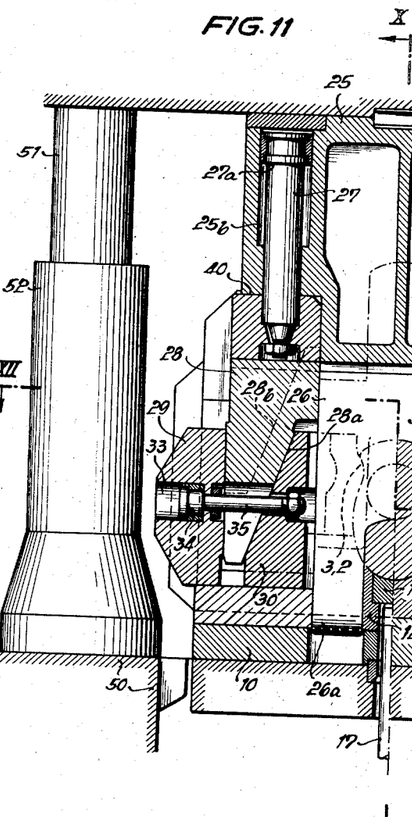
Figure 11 shows a section of the device along the line XI—XI in Figure 10 during the pressing process, and shows also a partial view of the forging press.
Figure 11A:
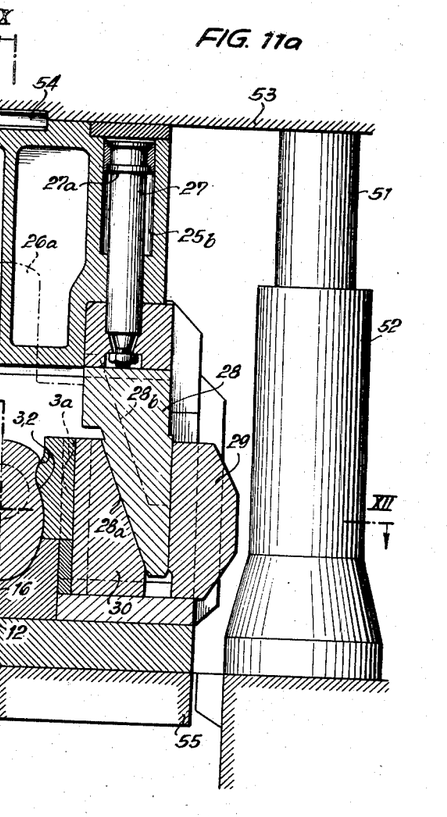
Figure 11a is a sectional view taken along lines XIa—XIa of Figure 10.
Figure 12:
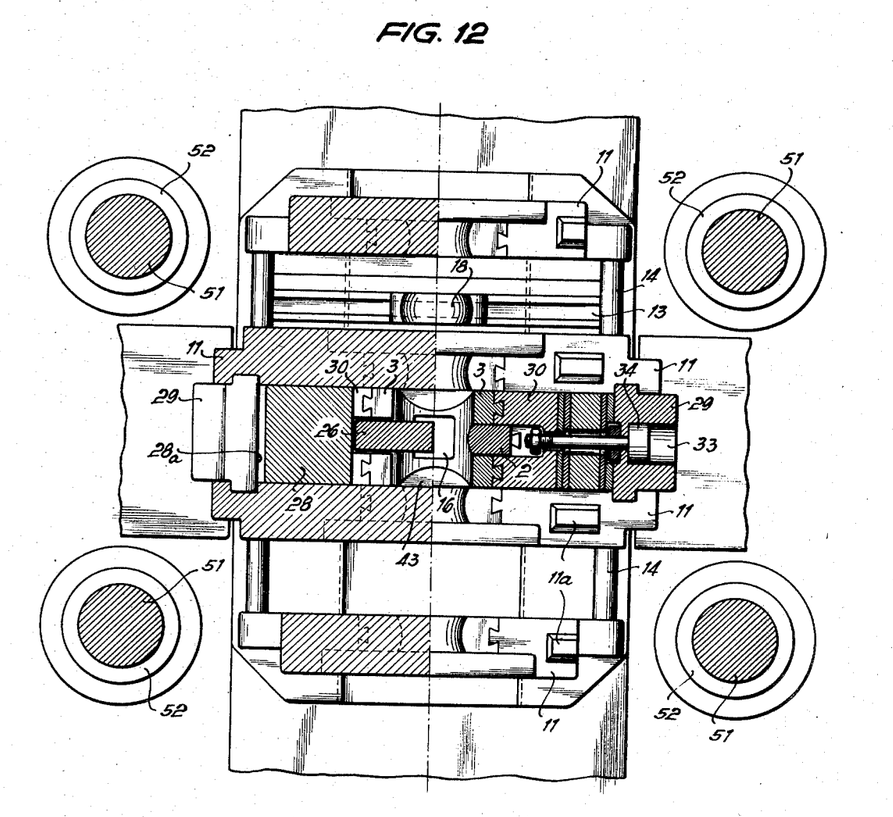
Figure 12 is a plan view of the device shown in section along the line XII—XII of Figure 11.
Figure 13:
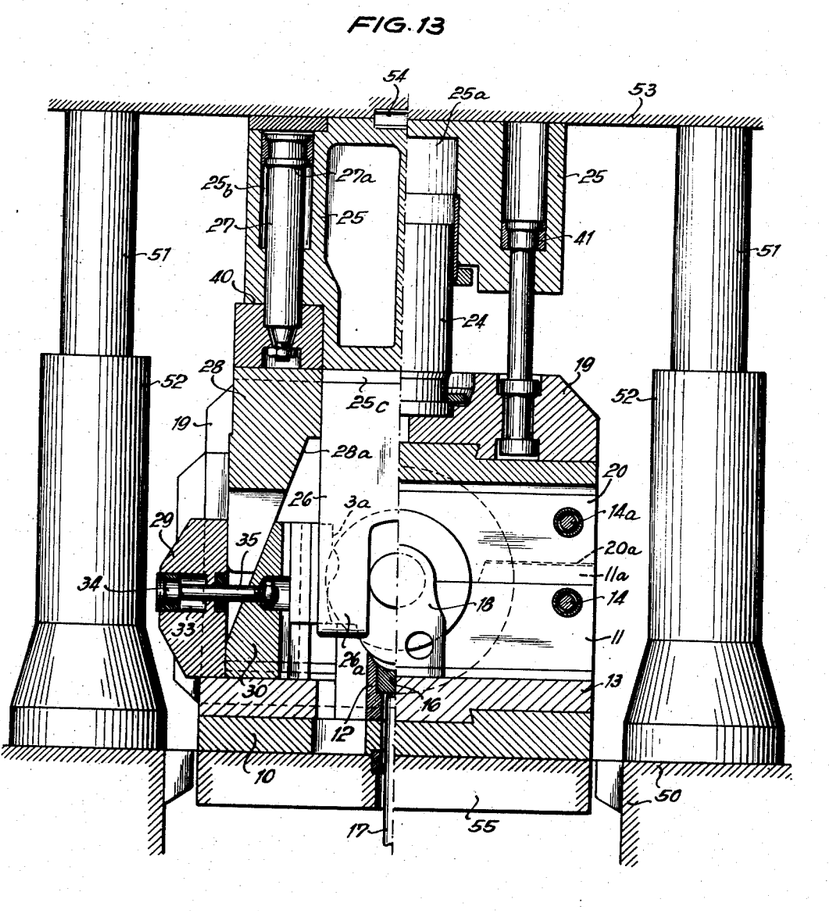
Figure 13 is a section along the line XIII—XIII of Figure 12.
Figure 14:
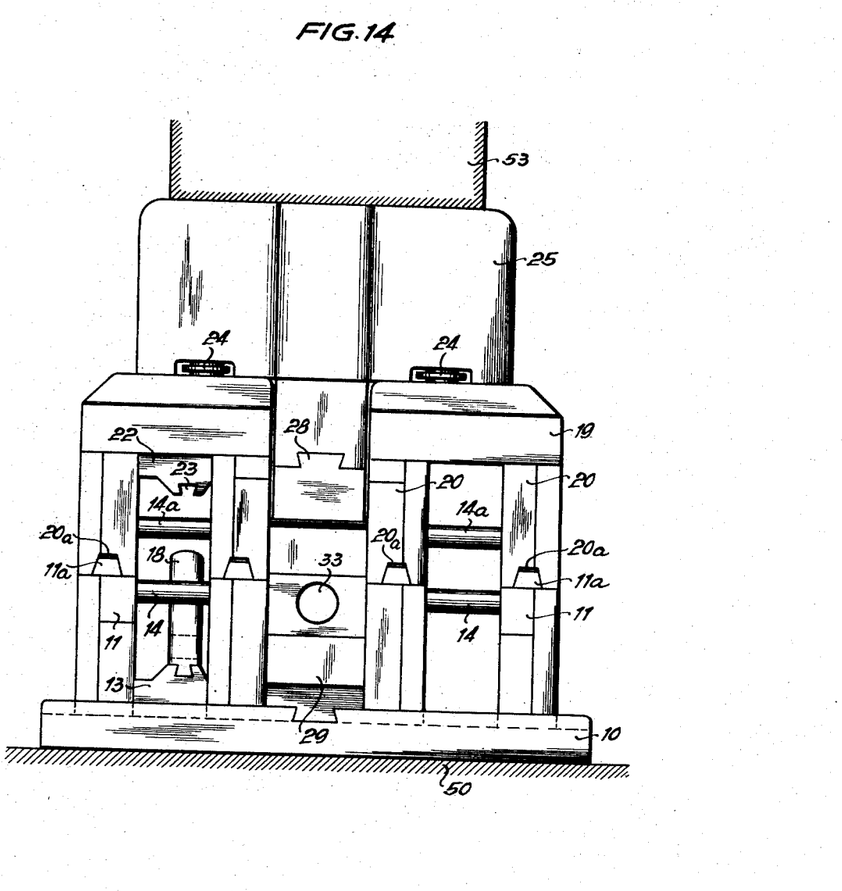
Figure 14 is a side view.

The apparatus consists of a base plate 10 mounted on sliding bed 55 in Figure 11. Four lower holding die supports 11 are fixed to the base plate and are provided with keys or projections 11a for cooperation with grooves or recesses 20a in upper holding die supports 20. The lower holding die supports 11 are spaced laterally by means of spacers 13 with respect to the central die 12 and are held together by horizontal pull rods 14. The central die 12 is provided with recesses 43 (Figure 6) for accommodating the fork 26a of the vertically movable punch 26. On one of the spacers 13 a slideway receives a bar 18, which serves as a stop for the finished throws. All lower holding die supports 11 are provided with exchangeable holding dies 15 similar to press saddles, connected by means of dovetailed slideways 15b, keys 15a and screws, which are not shown, to the holding die supports. An ejector 16 is arranged in the middle of the die 12 and can be lifted by means of an ejector piston rod 17 in order to lift the pressed parts off the die. A hydraulic drive can be arranged by means of a piston which is not shown. Holding cross-bars 19 can hold the workpiece from above. They support upper holding die supports 20, provided with grooves or recesses 20a, which engage with keys 11a, when the holding dies are closed. This will transmit lateral forces acting against the upper holding dies 20, 21, to the lower holding dies 11, 15. The support of the lower holding dies 11, 15, absorbs these forces. Holding dies 21 are fixed to the holding die supports 20, in the same manner as the lower holding dies 15 are fixed to the holding die supports 11. The upper holding die supports 20 are kept at their correct distance apart by means of spacers 22. One of these spacers 22 is provided with a dovetail slideway 23, in which a bar 18 can be located as required. These parts are held together by means of a tie rod 14a. Plungers 24, which slide in cylinders of a cylinder block 25 act against the cross-bars 19. The right-hand illustration of Figure 13 shows the press with the holding dies closed. Returning pistons 41 can return the holding cross-bars 19 again to their initial positions. The cylinder block 25 is fastened to the cross-head 53 by means of a centering plate 54 and screws, which are not shown. The cylinder block supports two further cylinders 25b (Figure 11) with associated pistons 27, which are rigidly fixed to the suspended wedges 28.

The pistons 27 are provided with shoulders 27a, which can make contact with the lower end of the cylinders 25b and act as stroke limiting stops. The cross-head 53 can also exert a pressure against the wedges 28 through the cylinder block 25. The wedges 28 rest with one face against horizontal wedge cross-bars 29, which are rigidly connected to the central holding die supports 11 and other correlated parts by means of the tie rod 14, and transfer the wedging pressure exerted against them by means of their shoulders 28a to the lower holding die support 11. The opposite surfaces of the wedges 28 press against displaceable die side parts 30. The latter surfaces of the wedges assume the position shown by chain-dotted lines 28b in Figure 11 or by full lines 28a in Figure 13, on the left, when the press cross-head 53 is in the upper position, that is before the work commences. The dies 3a of the die side parts 30 are at that stage not in contact with the webs of the prepared shaft (Figure 13, left). If the wedges 28 are moved down by lowering the press cross-head 53, they assume the position shown in full lines in Figure 11. The wedges can be placed in the same position if pistons 27 under the action of the pressure fluid push against the wedges 28. The dies 2 and 3 of the die side parts press against the enlarged portions of the shaft when the wedges 28 move down, as shown in Figure 2. For returning the wedges 28 and for retaining the wedges when the press cross-head 53 moves up, a pressure is applied against the surfaces 27a of the pistons 27. If during this operation the piston 27 is not working, the lower piston surface 27a, which is moving up, makes contact with the lower end of cylinder 25b and thus the wedge is raised. At the same time the movable die side parts 30 are removed laterally from their working position, so that they move into their rest position, such as at 3a (Figure 13, left). For this purpose cylinders 33 are provided, in which slide pistons 34, which are fixed by means of rod 35 to the die side parts 30.

A working piston 26 slides in a dovetailed slideway 25c on the cylinder block 25 and is employed to finish-press the throws on the prepared shaft, after it has been shaped as shown in Figures 3, 4, 5 and 7. During the finish-pressing operation the plungers 24 and the pistons 27 are returned into their cylinders 25a and 25b of the cylinder block 25 and remove in a known manner the pressure fluid from the cylinders through a relief valve, which is not shown. At shoulder 40 the pressure of the cross-head is transmitted through the cylinder block to the wedges 28.

The cylinders 25a, 25b, are connected in a known manner by means of articulated, telescoped or other types of movable pipes to feed pipes and are controlled from the press control stand, as also the cylinders 33.

The press operates as follows:

The forging apparatus is placed on the sliding bed 55 of the forging press, with the sliding bed in the moved-out position, the sliding bed is then returned into the press and the cylinder block 25 is fixed to the press cross-head 53, after the latter has been lowered. The cylinders 25a and 25b of the cylinder block 25 and the cylinders 33 of the horizontal wedge cross-bars 29 are connected by means of articulated tubes, telescoping tubes or such like with the connections on the press control stand. Now the press cross-head 53 is lifted hydraulically, while the holding cross-bar 19 with the parts 20 and 21 is raised, the prepared shaft is placed in the lower holding die consisting of the parts 15, and is pressed by the plunger 24 acting through the holding cross-bars 19, upper holding die supports 20 and upper holding dies 21 under the action of a hydraulic holding pressure against the lower holding dies 15 on the holding die supports 11 respectively. Now the cross-head 53, acting through the cylinder block 25, the wedges 28, and the die side parts 30, presses the dies 2 and 3 progressively against each enlarged portion of the shaft, which is then shaped as shown in Figures 5 and 7. The cross-head 53 is now raised by means of a returning device not shown in the illustration. Then the workpiece is moved forward by one journal distance, and is rotated at the same time by the angular distance of the next crank. The reference surface for the operation is now the surface 4 produced in the preceding operation on the enlarged portion. This sequence is repeated until all enlarged portions are provided with surfaces 4. When all shafts of the days programme have been forged in this manner, the punch 26 is mounted in the cylinder block 25 and the dies 2 are removed from the die side parts 30. Now a shaft provided with the opposite guide faces 4 is placed in the die in such a way that its first enlarged portion on the right hand side is situated underneath the press punch 26. The press cross-head 53, which is now moving down again, places first the fork 26a of the punch 26 over the initially deformed guide surfaces 4 of the enlarged portion, so that it is here firmly guided. Now the punch 26 finishes the throw by moving downward, while at the same time the plungers 24 and the pistons 27 are placed in position, and while the hydraulic pressure acting against them is maintained by a relief valve, they are pushed back into their cylinders. The dies 3, which are open at the top, will permit the material pushed out by the pressing of the throw to rise. Subsequently the press cross-head 53 is raised and the shaft is moved towards the right by one journal spacing, and is turned at the same time by the angular distance between the first and the second throw. The bar 18 has been placed first in the press to support the first throw. Thus all throws are pressed at the angular spacings which they were given during the preparing operations. Overlapping and the formation of fins are avoided because the pressing operation takes place in an open die. The grain flow of the fibres is also advantageous. The work of changing the device over from preparing to finish-pressing requires only very little time, because it is not necessary to exchange the laterally acting dies. The vertical pistons with the wedges require only little room and produce very high pressures owing to the wedge effect, so that large pieces can be worked in the confined space of one press. Also, when replacing the crank shaft for the forming of the crank webs, it is not necessary to rotate the crank shaft by, for instance, 90°, so that some fitting work is avoided. There are further savings of time and the necessity of re-heating is avoided due to the fact that in the finishing operation no measuring is necessary.

It is obviously also possible to carry out the process of the present invention on special purpose presses, provided with devices for the actuation of all parts of the dies. But the advantage of the present device consists in the fact that it can be operated by normal types of presses.

I claim:

1. A method of forging a crankshaft from a round shaft blank having reduced journal portions and an enlarged portion between said journal portions, said method comprising shaping diametrically opposite sides of the median part of said enlarged portion by applying pressure from opposite directions perpendicular to the blank axis to form parallel opposite guide surfaces having an extent longitudinally of the blank corresponding to that of the required crank pin, simultaneously shaping rough crank webs by applying pressure from opposite sides of the longitudinal axis of the blank in the same directions as the first applied-pressure to the remaining parts of said enlarged portion, finish shaping the crank pin and crank webs by displacing the material of said median part in a direction along and parallel to said guide surfaces which is perpendicular to the longitudinal axis of said blank to form the crank pin with excess material from said median part flowing into said rough crank webs and simultaneously confining said rough crank webs in a manner to permit flow of said excess material only in a direction perpendicular to the longitudinal axis of said blank and opposite to the direction of displacement of the material of said median part to complete the formation of the crank webs.

2. A method as defined in claim 1 in which said guide surfaces are formed with a distance therebetween approximately equal in diameter of the crank pin.

3. A method as defined in claim 1 in which the flow of excess material in said webs is in a direction to form balance weights on said webs.

4. A method of progressively forging individual throws on a multi-throw crank shaft from a round shaft blank having longitudinally spaced reduced journal portions and an enlarged portion between each adjacent pair of journal portions, said method comprising shaping diametrically opposite sides of the median part of the enlarged portion at one end of said blank by applying pressure from opposite directions perpendicular to the blank axis to form parallel opposite guide surfaces having an extent longitudinally of the blank corresponding to that of the required crank pin, simultaneously shaping rough crank webs by applying pressure from opposite sides of the longitudinal axis of the blank in the same direction as the first applied pressure to the remaining parts of said enlarged portion to complete partial formation of the first throw, rotating said blank through the angular distance required for the second throw and utilizing said guide surfaces to accurately orient the angular position of said blanks, repeating said shaping operation to form guide surfaces and rough crank webs on the second enlarged portion to complete the partial formation of the second throw and repeating these steps to complete the partial formation of all throws, finish shaping the crank pin and crank webs of said first throw by displacing the material of said median part in a direction along and parallel to said last named guide surfaces which is perpendicular to the longitudinal axis of said blank to form the first crank pin with excess material from said median part flowing into said crank web on said first enlarged portion, simultaneously confining said last named rough crank web in a manner to permit flow of said excess material only in a direction perpendicular to the longitudinal axis of said blank and opposite to the direction of displacement of the material of said median part to complete the formation of the crank web on said first enlarged portion and the formation of said first throw and repeating these finishing steps to complete the formation of all throws.

5. A method as defined in claim 4 in which said guide surfaces are formed with a distance therebetween approximately equal to the required diameter of the crank pin.

6. A method as defined in claim 4 in which the flow of excess material in said web is in a direction to form balance weights on said webs.

7. Forging apparatus for forming multi-throw crankshafts from a round shaft blank having a series of pressed-in journal portions and intermediate enlarged portions one for each throw, said apparatus comprising a base having side and front and rear edges, releasable holding mechanism comprising a plurality of fixed clamping dies disposed in spaced locations on said base between said side edges and a plurality of cooperating movable clamping dies movable toward and away from said fixed clamping dies for releasably engaging a blank to secure it in position and prevent elongation thereof, pressure shaping mechanism including aligned oppositely moving separate pairs of die means disposed on said base for movement away from said front and rear edges and into engagement with said blank for simultaneously forming opposite guide surfaces on successive enlarged portions of said blank in the median part thereof and for initially shaping crank web outlines on each side of the guide surfaces, a cross-head movable toward and away from said base in a direction normal to the movement of said die means, a pronged press punch carried by said cross head and movable thereby into engagement with said blank and in guiding contact with said guide surfaces for finish pressing the throws from successive median parts and a fixed forming die mounted on said base in alignment with said punch and cooperating therewith in finish pressing said throws.

8. Forging apparatus as defined in claim 7, including block means attached to said cross-head, means on said block means for removably and fixedly securing said press punch thereto between said block means and said base, said releasable holding mechanism including movable components mounted in said block means, wedge means engaging said die means for moving the same in a direction normal to the movement of said cross head and means carried by said block means for actuating said wedge means.

9. Forging apparatus as defined in claim 8 in which the means for actuating said wedge means comprises cylinder and piston means carried by said block means.

10. Forging apparatus as claimed in claim 7 in which said fixed forming die is a one piece die having opposite recesses for accommodating the prongs of the press punch.

References Cited in the file of this patent

UNITED STATES PATENTS

| | | |
|---|---|---|
| 221,102 | Rowell | Oct. 28, 1879 |
| 1,060,663 | Bauroth | May 6, 1913 |
| 1,717,513 | Larcher | June 18, 1929 |
| 2,534,613 | Meley | Dec. 19, 1950 |
| 2,535,295 | La Font | Dec. 26, 1950 |
| 2,747,253 | Conchon | May 29, 1956 |

FOREIGN PATENTS

| | | |
|---|---|---|
| 307,880 | Germany | Sept. 14, 1918 |
| 318,228 | Germany | Jan. 15, 1920 |